United States Patent [19]

Newsteder

[11] Patent Number: 4,876,824
[45] Date of Patent: Oct. 31, 1989

[54] CANDY PLANTER

[75] Inventor: Robert Newsteder, Utica, N.Y.

[73] Assignee: Chocolate Pix, Inc., Utica, N.Y.

[21] Appl. No.: 169,437

[22] Filed: Mar. 17, 1988

[51] Int. Cl.⁴ ............................................. A01G 9/02
[52] U.S. Cl. ................................................ 47/66; 47/67
[58] Field of Search .................................. 47/39, 66–68, 47/41, 4.11, 41.12, 41.13; 40/152, 152.1; 206/45.14, 45.19, 577, 423

[56] References Cited

U.S. PATENT DOCUMENTS

| 516,259 | 3/1894 | Brueckner | 47/41 |
| 1,063,395 | 6/1913 | Scribner | 47/67 |
| 1,967,320 | 7/1934 | Newman | 47/41 |
| 2,312,007 | 2/1943 | Thrasher | 47/41.12 |
| 2,702,441 | 2/1955 | Jones | 47/41.12 |
| 3,812,617 | 5/1974 | Brody | 47/41.12 |
| 4,268,530 | 5/1981 | Wyslotsky | 206/45.14 |

Primary Examiner—Robert A. Hafer
Assistant Examiner—Charles H. Sam
Attorney, Agent, or Firm—Cobrin, Feingertz & Gittes

[57] ABSTRACT

A combination food holder and planter includes a main frame having an opening; a food support frame removably connected to the main frame within the opening for holding at least one food item within the opening; and a planter connected to the main frame for supporting a plant within the opening when the food support frame is removed from the main frame.

11 Claims, 4 Drawing Sheets

FIG. 7
FIG. 8
FIG. 9
FIG. 10
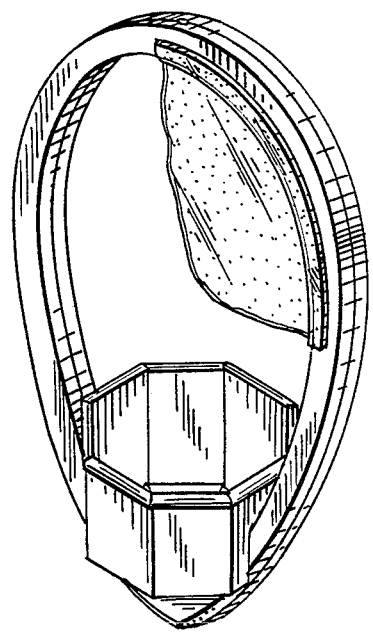
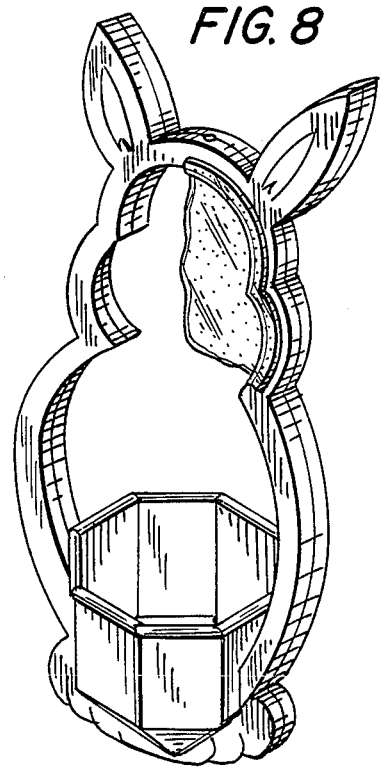
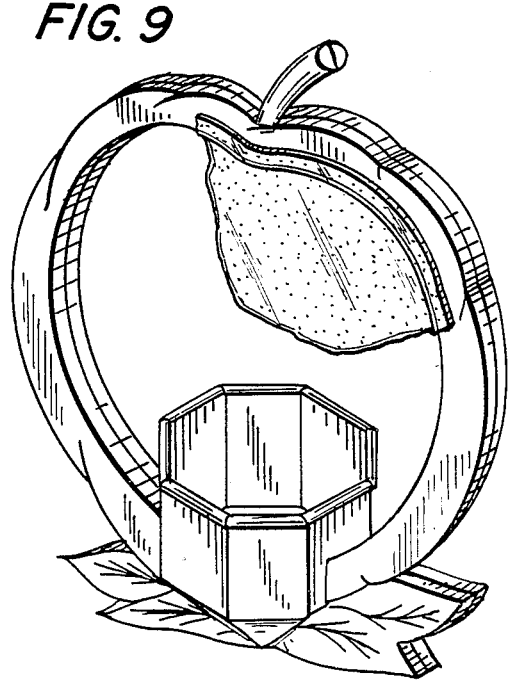
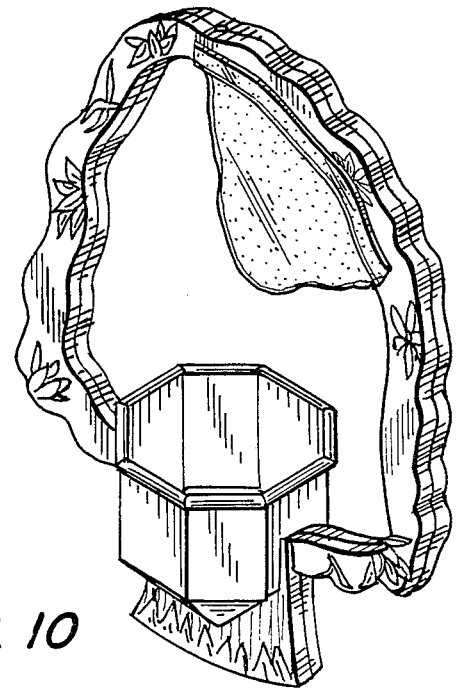

4,876,824

CANDY PLANTER

BACKGROUND OF THE INVENTION

This invention relates generally to planters, and more particularly, is directed to a hanging planter designed to visually contain a plurality of removable food items therein and then be used as a planter.

Often, for holidays, special occasions and the like, candy and/or plants are given as presents. The candy is generally contained in a cardboard box which is discarded after the candy is eaten. The plant is contained in a planter that is adapted to sit on a surface or hang from a high location.

OBJECTS AND SUMMARY OF THE INVENTION

Accordingly, it is an object of the present invention to provide a candy planter that provides candy in a decorative setting and which can be used as a planter after the candy is removed.

It is another object of the present invention to provide such a candy planter in which the candy is visible.

In accordance with an aspect of the present invention, a combination food holder and planter includes a main frame having an opening; food support means removably connected to the main frame within the opening for holding at least one food item within the opening; and plant support means connected to the main frame for supporting a plant within the opening when the food support means is disconnected from the main frame.

The above and other objects, features and advantages of the present invention will become readily apparent from the following detailed description which is to be read in connection with the accompanying drawings.

BRIEF DESCRIPTION OF THE DRAWINGS

FIGS. 7, 8, 9 and 10 show, respectively, egg, rabbit, pumpkin and tree-shaped configurations of the present invention.

DETAILED DESCRIPTION OF A PREFERRED EMBODIMENT

Figure 1:
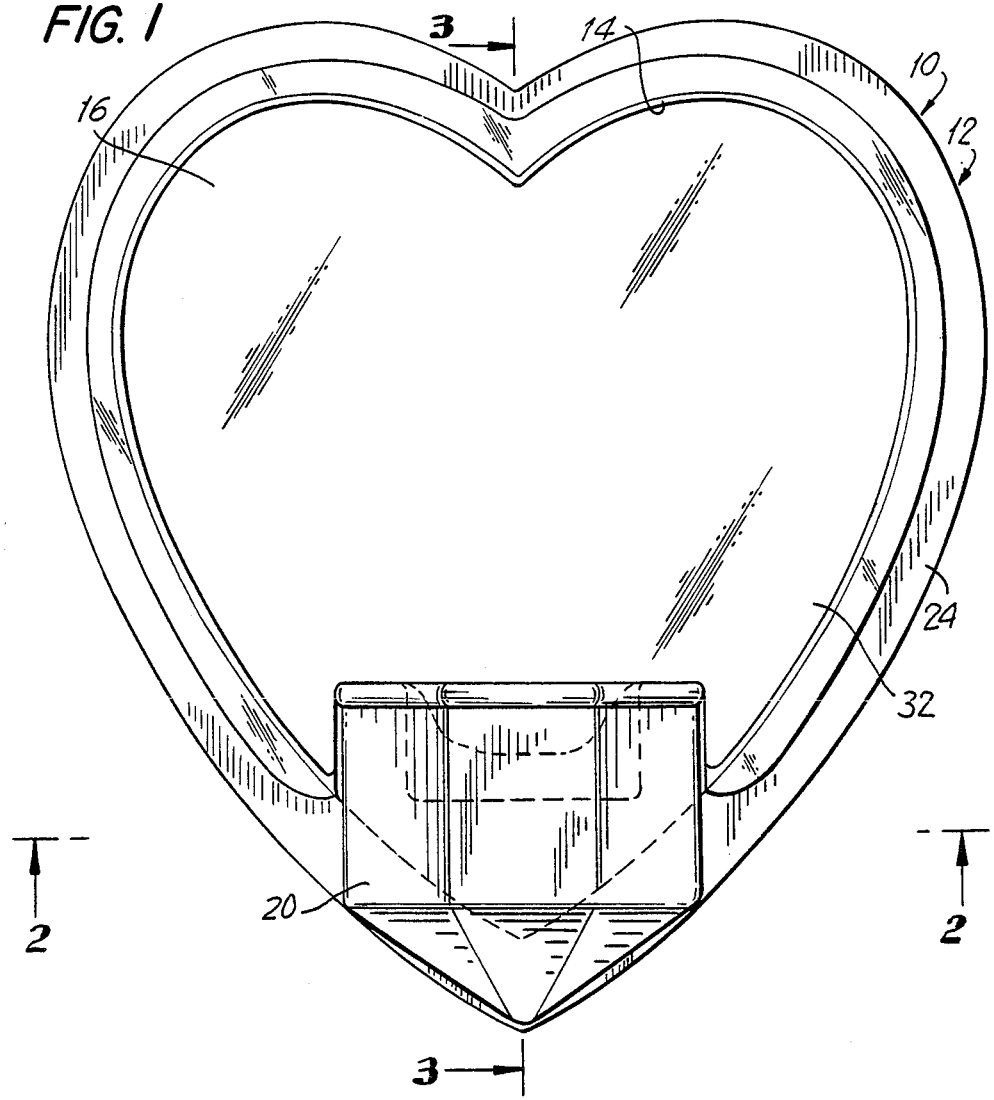
FIG. 1 is a front elevational view of a candy planter according to one embodiment of the present invention, with candy contained therein.
Figure 2:
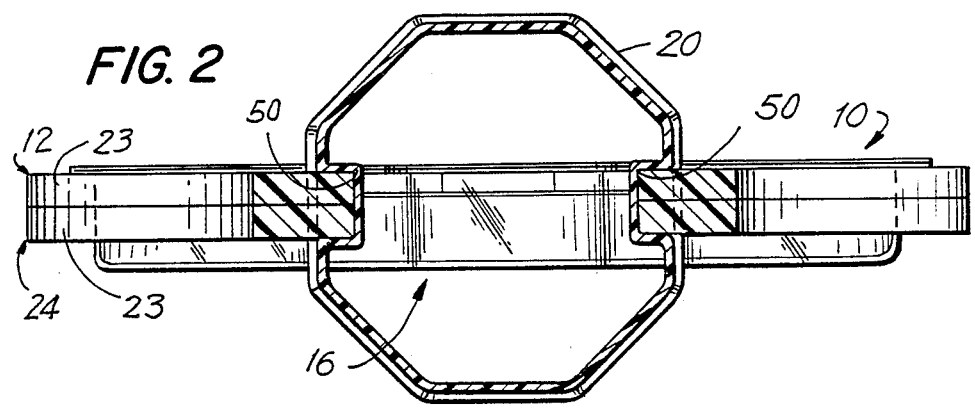
FIG. 2 is a cross-sectional view of the candy planter of FIG. 1, taken along line 2—2 thereof.

Referring to the drawings in detail, a candy planter 10 according to a preferred embodiment of the present invention generally includes a main frame 12 having an opening 14; a food support frame 16 removably connected to main frame 12 within opening 14 for holding at least one food item 18 within opening 14; and a planter 20 connected to main frame 12 for supporting a plant 22 within opening 14 when food support frame 16 is removed from main frame 12.

Specifically, main frame 12 is formed from two molded half members 23 which are secured to each other by glueing, clipping or by internal snaps, to form a tubular member 24 having a generally rectangular or square cross-section. Tubular member 24 is preferably formed in a heart shaped configuration, as shown in FIG. 1, so as to define a substantially central opening 14 therein. Although a heart shaped configuration is shown, it will be appreciated that other suitable configurations may be used, such as a pumpkin configuration for Halloween, and the like.

In addition, the upper portion of main frame 12 may have an aperture therein, through which a hook 28 (FIG. 6) can be inserted for supporting main frame 12 in a hanging manner.

Food support frame 16 has an outer configuration and dimensions which are substantially identical to that of opening 14. It is of course to be appreciated that while opening 14 is shown as heart shaped that other shapes could be used, that is, egg shaped, rabbit shaped, pumpkin shaped, Christmas tree shaped and the like. In this manner, food support frame 16 can be inserted in opening 14 and fit therein with a friction fit with the inner wall of tubular member 24.

Specifically, food support frame 16 preferably includes a thin rear wall 30 and a thin front wall 32 spaced from each other such that food item 18, such as candy, can be supported therebetween. Front wall 32 is made of a transparent plastic material so that the food item 18 can be viewed. Rear wall 32 is opaque.

Figure 3:
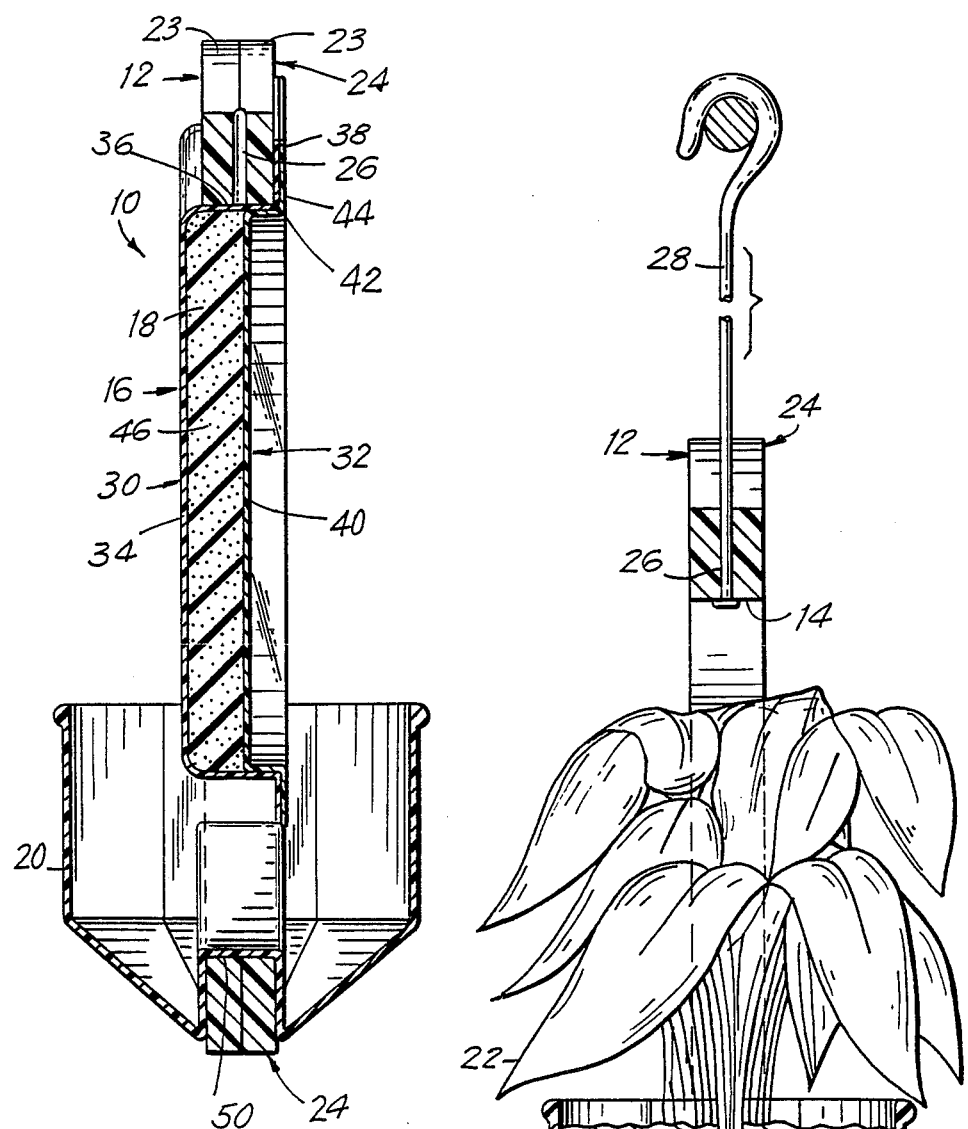
FIG. 3 is a cross-sectional view of the candy planter of FIG. 1, taken along line 3—3 thereof.

As best shown in FIGS. 1 and 3, rear wall 30 is constructed with a vertically oriented, heart shaped planar section 34 with dimensions substantially identical to those of opening 14. A rim section 36 is formed integrally with planar section 34 and extends forwardly thereof in a horizontal direction so as to fit snugly within main frame 12, and particularly, to engage the inner wall of tubular member 24 with a friction fit. Lastly, rear wall 30 includes a vertically oriented, stabilizing section 38 that is formed integrally with the forward end of rim section 36 and which lies flat against the front facing wall of tubular member 24 when rim section 36 is fit snugly within opening 14 so as to correctly position and stabilize planar section 34 in main frame 12.

Front wall 32 is also formed with a vertically oriented, heart shaped planar section 40 with dimensions substantially identical to those of opening 14. A rim section 42 is formed integrally with planar section 40 and extends forwardly thereof in a horizontal direction so as to fit snugly within main frame 12, and particularly, to engage the inner wall of rim section 36 with a friction fit. Rim section 42 has a widthwise or horizontal dimension less than that of rim section 36 so as to be spaced therefrom, as shown in FIG. 3. Lastly, front wall 32 includes a vertically oriented, stabilizing section 44 that is formed integrally with the forward end of rim section 42 and which lies flat against the front facing wall of stabilizing section 38 when rim section 42 is fit snugly within rim section 36, so as to correctly position and stabilize planar section 40 within main frame 12.

In this manner, when front wall 32 is fit within rear wall 30, as shown, a space 46 is maintained between the two walls for receiving a food item 18 such as candy.

Planter 20 has a cup-shaped configuration for holding a plant 22 therein. The lower wall of planter 20 has a groove 50 which extends along the lower wall of planter 20 in a V-shaped manner. Accordingly, planter 20 can stably sit on the lower portion of tubular member 24. In other words, the lower portion of tubular member 24 fits within groove 50 to hold planter 20 within the lower portion of opening 14, as best shown in FIGS. 2, 3, 5 and 6.

Figure 6:
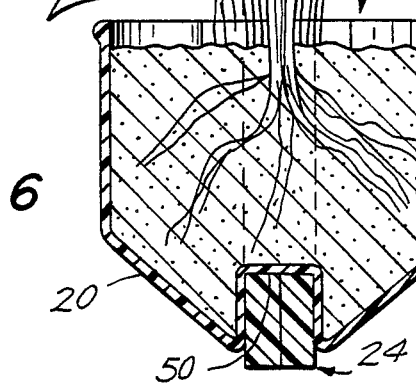
FIG. 6 is a cross-sectional view of the candy planter of FIG. 4, taken along line 6—6 thereof.
Figure 4:
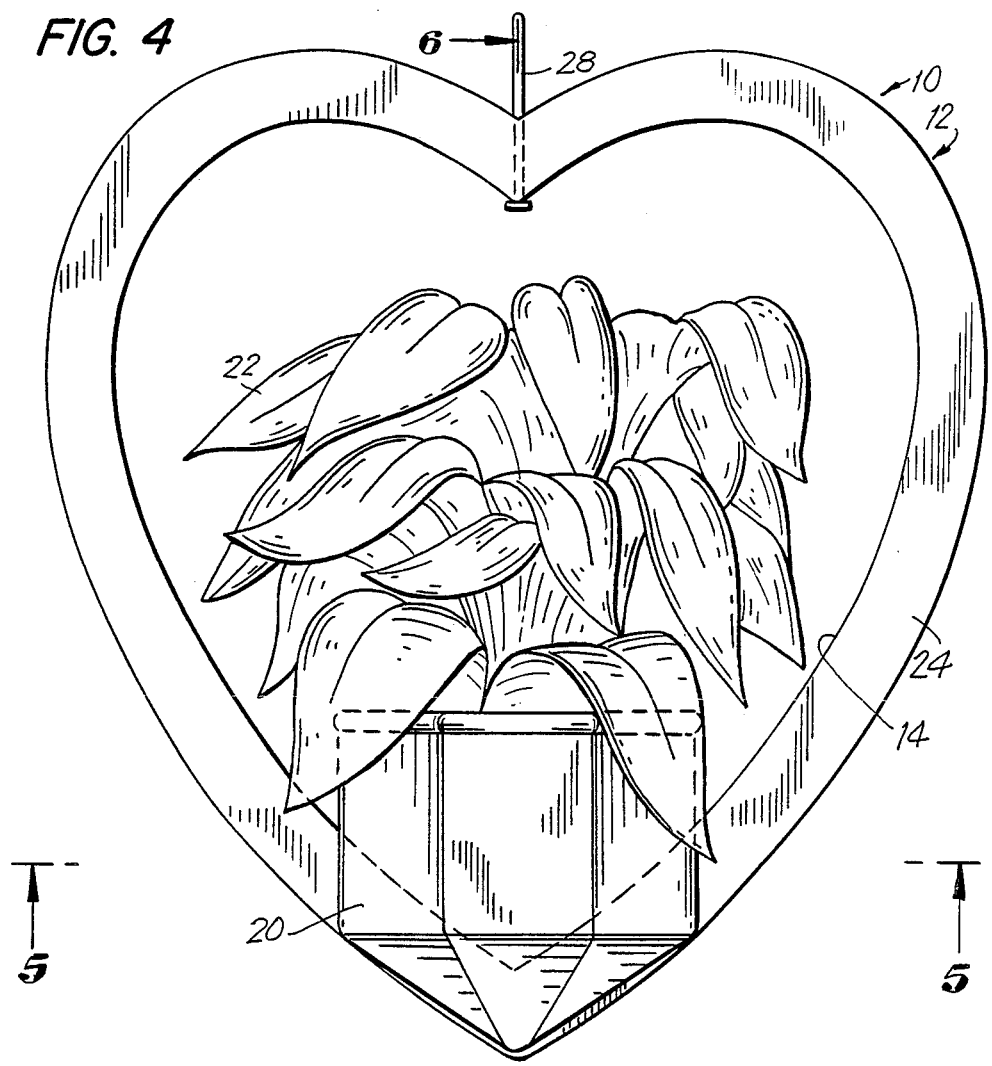
FIG. 4 is a front elevational view of the candy planter of FIG. 1, with the candy removed and a plant held thereby.
Figure 5:
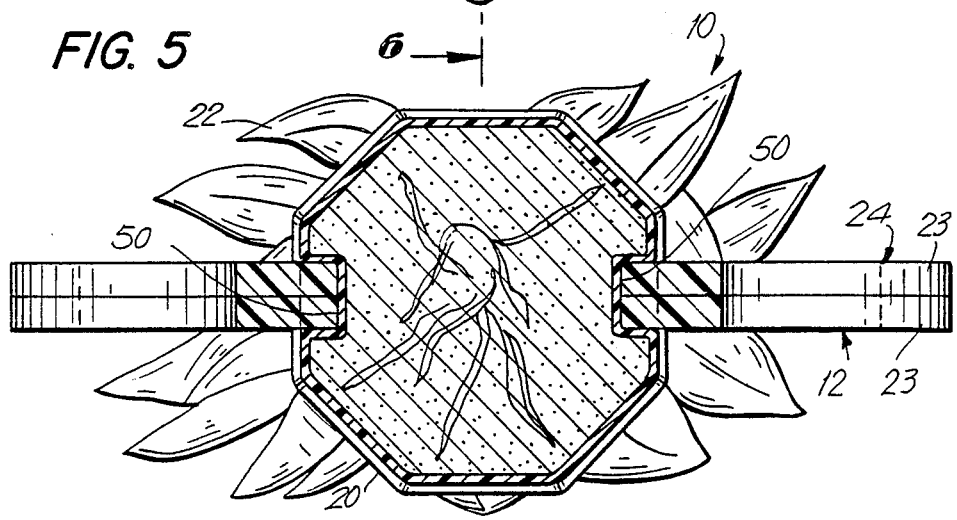
FIG. 5 is a cross-sectional view of the candy planter of FIG. 4, taken along line 5—5 thereof.

When candy planter 10 is initially sold, planter 20 sits on the lower portion of tubular member 24, as shown in FIG. 1. In addition, food support frame 16 is fit within opening 14, as also shown in FIG. 1. At such time, food support frame 16 visually carries a food item 18, such as candy. The customer removes food support frame 16 and the food item 18 therein. As such, all that remains is main frame 12 and planter 20. Then, a plant 22, along with soil, can be positioned in planter 22 so as to extend within opening 14, as shown in FIGS. 4-6. Candy planter 10 can then be hung from a ceiling or other high location by means of hook 28. Alternatively, it can be set on a base or be self-standing in the shape of a tree, a rabbit or the like.

Thus, the present invention provides for a novel combination, that is, a planter 20 which can be sold with food item 18 that can be removed, whereby the planter 20 can be used to hold a plant 22 therein.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is climed is:

1. A combination food holder and planter comprising:
    a main frame having an opening;
    a substantially flat means for supporting food removably connected to said main frame within said opening with the food then being constrained from movement in part by abutting against said food support means; and
    plant support means connected to said main frame for supporting a plant within said opening when said food support means is removed from said main frame.

2. A combination according to claim 1; wherein said main frame has a shape selected from the group consisting of a heart-shaped configuration, a rabbit configuration, an eggshaped configuration, a pumpkin configuration and a tree configuration.

3. A combination according to claim 1; wherein said opening is substantially centrally located within said main frame.

4. A combination according to claim 1; wherein said main frame is formed by a circumferential tubular member defining said opening therein.

5. A combination according to claim 4; wherein said plant support means includes a cup-shaped member having a groove in a lower wall thereof for receiving said tubular member.

6. A combination according to claim 5; wherein said main frame has a shape selected from the group consisting of a heart-shaped configuration, a rabbit configuration, an egg-shaped configuration, a pumpkin configuration and a tree configuration and a lower portion of said tubular member fits within said groove such that a plant held by said plant support means extends within said opening.

7. A combination according to claim 1; wherein said food support means includes a rear wall and a front wall spaced from said rear wall for holding the at least one food item therein.

8. A combination according to claim 7; wherein said front wall is transparent.

9. A combination according to claim 7; wherein said rear wall is formed by a substantially planar section having a configuration and dimensions substantially identical to those of said opening; a rim section formed with said substantially planar section and extending transversely therefrom for fitting within the opening of said main frame with a friction fit; and a stabilizing section formed with said rim section for engaging with said main frame to correctly position and stabilize said rear wall in said main frame.

10. A combination according to claim 9; wherein said front wall is formed by a substantially planar section having a configuration and dimensions substantially identical to those of said opening; a rim section formed with said substantially planar section and extending transversely therefrom for fitting within the rim section of said rear wall with a friction fit; and a stabilizing section formed with said rim section for engaging with said stabilizing section of said rear wall to correctly position and stabilize said front wall in said rear wall.

11. A combination according to claim 10; wherein the rim section of said front wall is narrower than the rim section of said rear wall so as to provide a space between said rear wall and said front wall for receiving at least one food item.

* * * * *